United States Patent

Aun et al.

Patent Number: 5,971,246
Date of Patent: Oct. 26, 1999

[54] OVEN FOR REFLOWING CIRCUIT BOARD ASSEMBLIES AND METHOD THEREFOR

[75] Inventors: Lam Cheow Patrick Aun; Ka Tiek Lim, both of Penang; We Kok Nyo, Klang, all of Malaysia

[73] Assignee: Motorola, Inc., Schuamburg, Ill.

[21] Appl. No.: 08/851,864

[22] Filed: May 6, 1997

[30] Foreign Application Priority Data

May 8, 1996 [MY] Malaysia ............................ PI-9601743

[51] Int. Cl.$^6$ ........................................... B23K 3/00
[52] U.S. Cl. ............................................ 228/1.1; 126/21 A
[58] Field of Search ................................ 228/1.1, 37, 42; 126/21 A; 432/199, 239; 219/391, 400

[56] References Cited

U.S. PATENT DOCUMENTS

| | | | |
|---|---|---|---|
| 4,363,434 | 12/1982 | Flury | 228/37 |
| 4,885,841 | 12/1989 | McNabb | 228/110.1 |
| 5,230,460 | 7/1993 | Deamborsio et al. | 228/232 |
| 5,678,752 | 10/1997 | Kaminsky et al. | 228/37 |

*Primary Examiner*—Samuel M. Heinrich
*Attorney, Agent, or Firm*—Dale W. Dorinski

[57] ABSTRACT

An oven (100) for reflowing circuit board assemblies (102). Air is pumped into a heating chamber (104) from which the air is then communicated through one or more apertures (112) in a panel (114) to a reflow chamber (106). A conveyor track (108) conveys the assemblies (102) through the reflow chamber (106). In use, the oven turbulates the air sufficient to vibrate components on the assemblies (102) and, thereby, realigns components inadvertently displaced off pads of the assemblies (102).

9 Claims, 2 Drawing Sheets

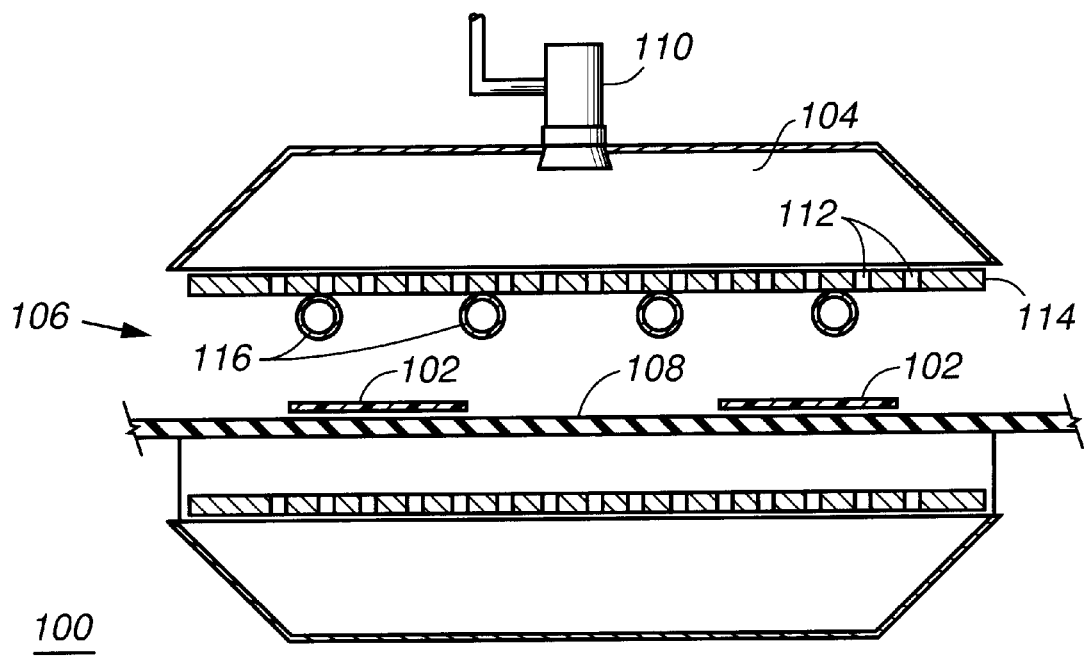
FIG. 1
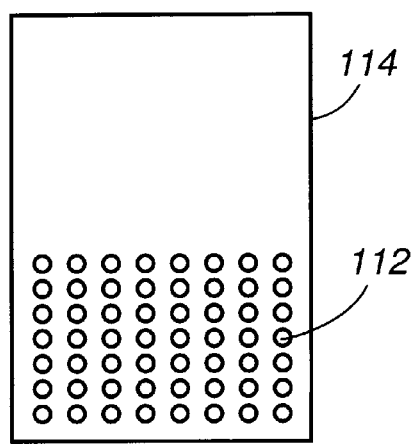
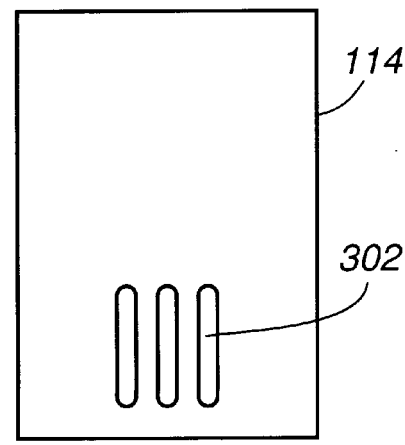
FIG. 2   FIG. 3

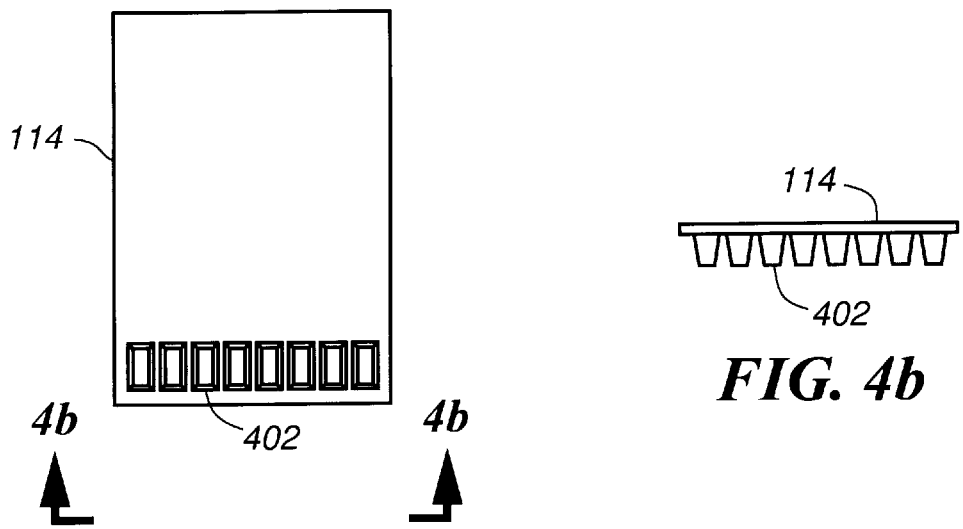
FIG. 4a
FIG. 4b
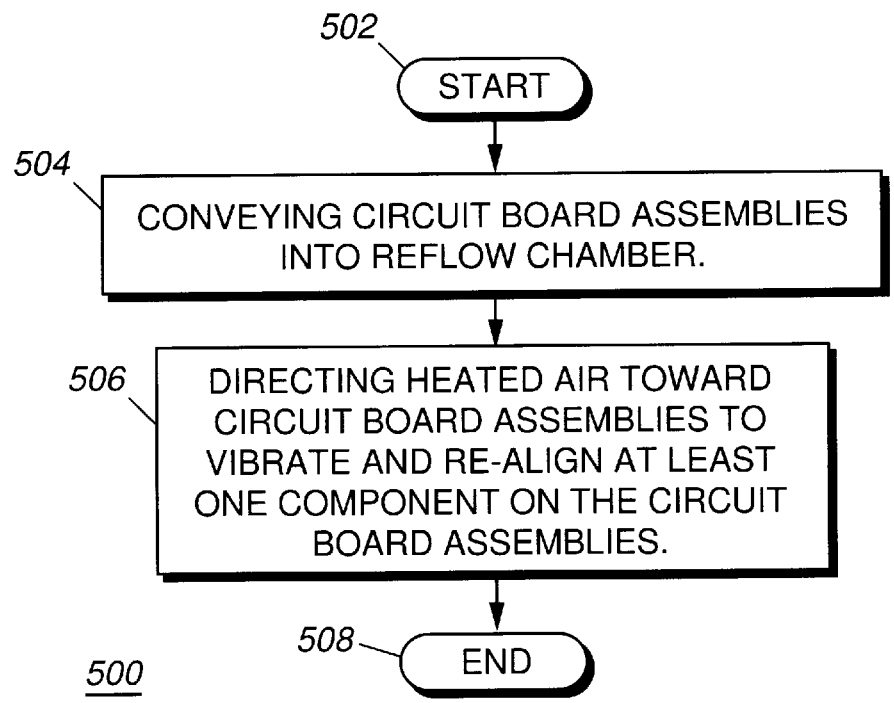
FIG. 5

OVEN FOR REFLOWING CIRCUIT BOARD ASSEMBLIES AND METHOD THEREFOR

FIELD OF THE INVENTION

This invention relates to an oven for reflowing circuit board assemblies and method therefor.

BACKGROUND OF THE INVENTION

Components to be mounted on a circuit board are conventionally placed onto pads on the circuit board to form a circuit board assembly. The assembly is then reflowed through an oven for soldering the components to the circuit board. This therefore minimizes assembly time as soldering of components to one side of the circuit board is done in a single operation.

Conventional reflow ovens are not adapted to re-align components that are inadvertently misaligned from pads on the circuit board. Accordingly, this can result in soldering defects and consequently, lower circuit board assembly yield.

To eliminate these defects, U.S. Pat. No. 4,885,841 describes a reflow oven with a mechanism for vibrating a circuit board assembly during reflow to re-align displaced components. However, in vibrating the circuit board assembly, all components on the circuit board are subjected to the vibrating. As a result, the vibrating may cause components to drop off from an undersurface of a two-sided circuit board assembly. Furthermore, the mechanism described in U.S. Pat. No. 4,885,841 is only effective in areas within a reflow oven where temperatures are sufficient for solder to be in a molten state. This can unfortunately lead to poor solder joints if vibration occurs when the solder is setting.

SUMMARY OF THE INVENTION

It is an object of this invention to overcome or at least alleviate at least one of the problems associated with reflowing circuit board assemblies.

According to one aspect of the invention, there is provided an oven for reflowing circuit board assemblies, said oven comprising:

a reflow chamber having a conveyor track therein, said conveyor track being adapted to convey said assemblies through said reflow chamber;

a heating chamber having one or more apertures in at least one panel thereof, said apertures being in communication with said reflow chamber;

a pump means for pumping air into said heating chamber; and a heating means associated with said heating chamber, said heating chamber being adapted to heat said air;

wherein, in use, said air passes through one or more said apertures at a force sufficient to vibrate and re-align at least one component on said assemblies.

Preferably, said panel may be a common panel between said reflow chamber and said heating chamber.

Suitably, said apertures may be slotted.

Alternatively, said one or more apertures may be inwardly tapering toward said reflow chamber.

There may be funneling means associated with said apertures for directing said air into said reflow chamber.

Suitably, said pump means may recycle at least some of said air from said reflow chamber.

Preferably, said oven further may comprise air jet means for providing heated air to said reflow chamber.

Suitably, said air jet means may comprise one or more tubes with apertures therein.

According to another aspect of the invention, there is provided a method for reflowing circuit board assemblies, said method comprising the steps of:

(i) conveying said assemblies into a reflow chamber of an oven; and (ii) directing heated air towards said assemblies, wherein said air is directed at a force sufficient to vibrate and re-align at least one component on said assemblies.

BRIEF DESCRIPTION OF THE DRAWINGS

In order to describe the invention and to put it into practical effect, reference will now be made to preferred embodiments as illustrated with reference to the accompanying drawings in which:

FIG. 1 is a cross-section of a section of an oven in accordance with the invention;

FIG. 2 is a first preferred embodiment of a panel in the section of FIG. 1 in accordance with the invention;

FIG. 3 is a second preferred embodiment of the panel in the section of FIG. 1 in accordance with the invention;

FIGS. 4a and 4b show, respectively, a plan view and a side view of a third preferred embodiment of the panel in the section of FIG. 1 in accordance with the invention; and FIG. 5 shows a method for reflowing circuit board assemblies through the section of FIG. 1 in accordance with the invention.

DETAILED DESCRIPTION OF THE INVENTION

Circuit board assemblies 102 are reflowed through a section of an oven 100 as shown in cross-section in FIG. 1 in accordance with the invention. The oven 100 comprises a heating chamber 104 adapted to heat air with heating means (not shown), a reflow chamber 106 having a conveyor track 108 therein to convey the assemblies 102, and pump means 110 for pumping air into the heating chamber 104. The pump means 110 recycles at least some of the air from the reflow chamber 106. Within the heating chamber 104, one or more apertures 112 in at least one panel 114 communicates the air to the reflow chamber 106. The panel 114 is a common panel between the reflow chamber 106 and the heating chamber 104. The oven 100 further comprises air jet means 116 for providing heated air to the reflow chamber 106. The air jet means 116 comprises one or more tubes with apertures therein.

In use, the air passes through one or more of the apertures 112 at a force sufficient to vibrate and re-align at least one component on the assemblies 102. Components inadvertently displaced off pads of the assemblies 102 are re-aligned using the air and not with a mechanism vibrating the assemblies 102 as in the prior art. Hence, this invention is advantageous over the prior art as not all components on the assemblies 102 are subjected to vibrations.

In accordance with the invention, the panel 114 of FIG. 1 has different embodiments. FIG. 2 shows a plan view of a first preferred embodiment of the panel 114 wherein the apertures 112 are disposed in one half of the panel 114. FIG. 3 shows a plan view of a second preferred embodiment of the panel 114 wherein the apertures 112 are slotted 302. FIGS. 4a and 4b show, respectively, a plan view and a side view of a third preferred embodiment of the panel 114. The side view of FIG. 4b, from direction A of FIG. 4a, shows how the apertures 112 inwardly tapers toward the reflow chamber 106. These different embodiments of the panel 114 allow for directing the air towards selected locations or components on the assemblies 102.

FIG. 5 shows a method 500 for reflowing circuit board assemblies 102 through the oven 100 of FIG. 1 in accordance with the invention. The method 500 begins at step 504 with conveying the assemblies 102 into the reflow chamber 106. Next, in step 506, the method 500 continues with directing heated air towards the assemblies 102. The heated air is directed at a force sufficient to vibrate and re-align at least one component on the assemblies 102. Applied according to the method 500 as described, the invention advantageously uses heated air to provide the force to vibrate and re-align components on the assemblies 102. Hence, unlike the mechanism of the prior art, the invention does not subject all components on the assemblies 102 to the force.

The invention is applied according to requirements for reflowing the assemblies and it is to be understood that the invention is not restricted to any one of the embodiments described herein.

We claim:

1. An oven for reflowing circuit board assemblies, said oven comprising:

a reflow chamber having a conveyor track therein, said conveyor track being adapted to convey said assemblies through said reflow chamber;

a heating chamber having one or more apertures in at least one panel thereof, said apertures being in communication with said reflow chamber;

a pump means for pumping air into said heating chamber; and a heating means associated with said heating chamber, said heating chamber being adapted to heat said air, wherein, in use, said air passes through one or more said apertures at a force sufficient to vibrate and re-align at least one component on said assemblies.

2. The oven as claimed in claim 1 wherein said panel is a common panel between said reflow chamber and said heating chamber.

3. The oven as claimed in claim 2, wherein said apertures are slotted.

4. The oven as claimed in claim 2 wherein said pump means recycles at least some of said air from said reflow chamber.

5. The oven as claimed in claim 1, wherein said apertures are slotted.

6. The oven as claimed in claim 1 wherein said apertures inwardly taper toward said reflow chamber.

7. The oven as claimed in claim 1 wherein said pump means recycles at least some of said air from said reflow chamber.

8. The oven as claimed in claim 1 wherein said oven further comprises air jet means for providing heated air to said reflow chamber.

9. The oven as claimed in claim 8 wherein said air jet means comprises one or more tubes with apertures therein.

* * * * *